(12) United States Patent
Zhuang

(10) Patent No.: US 12,463,573 B2
(45) Date of Patent: Nov. 4, 2025

(54) WATER PUMP CAPABLE OF AUTOMATICALLY ADJUSTING ROTATING SPEEDS AT REGULAR INTERVALS

(71) Applicant: Bo Zhuang, Ningbo (CN)

(72) Inventor: Bo Zhuang, Ningbo (CN)

( * ) Notice: Subject to any disclaimer, the term of this patent is extended or adjusted under 35 U.S.C. 154(b) by 16 days.

(21) Appl. No.: 18/424,918

(22) Filed: Jan. 29, 2024

(65) Prior Publication Data

US 2025/0247032 A1    Jul. 31, 2025

(51) Int. Cl.
*H02P 23/20*    (2016.01)

(52) U.S. Cl.
CPC ................... *H02P 23/20* (2016.02)

(58) Field of Classification Search
CPC .......... F04B 17/03; F04B 35/04; F04B 49/06; F04C 14/00; F04C 28/00; F04C 2270/00; F04D 15/00; F04D 27/00
See application file for complete search history.

(56) References Cited

U.S. PATENT DOCUMENTS

| 2003/0020420 A1* | 1/2003 | Naito | ........................ | H02P 6/24 |
| | | | | 318/280 |
| 2004/0160208 A1* | 8/2004 | Youm | ....................... | H02P 3/22 |
| | | | | 318/801 |

* cited by examiner

*Primary Examiner* — Shafiq Mian
(74) *Attorney, Agent, or Firm* — Jose Cherson Weissbrot

(57) ABSTRACT

An electronic device for controlling a water pump comprises a speed regulating module, a control module, a storage module and a communication module; the speed regulating module comprises a relay group, a starting capacitor group and a coil group; the relay group respectively comprises a first relay, a second relay and a third relay, and all three relays comprise a first end and a second end; the starting capacitor group includes a first starting capacitor, a second starting capacitor and a third starting capacitor respectively; the coil group comprises a first main coil, a second main coil, a first secondary coil and a second secondary coil, and all four coils have a first end and a second end; two ends of the electronic device are respectively connected with a neutral line and a live line.

20 Claims, 14 Drawing Sheets

WATER PUMP CAPABLE OF AUTOMATICALLY ADJUSTING ROTATING SPEEDS AT REGULAR INTERVALS

TECHNICAL FIELD

The present invention relates to the technical field of water pumps, in particular to a water pump capable of automatically adjusting rotating speeds at regular intervals.

BACKGROUND

A water pump is a machine that transports or pressurizes liquid. It transfers the mechanical energy or other external energy of the prime mover to the liquid, which increases the energy of the liquid. It is mainly used to transport liquids including water, oil, acid-base liquid, emulsion, suspension emulsion and liquid metal, and also can transport liquids, gas mixtures and liquids containing suspended solids. At present, the speed of water pumps is switched manually, but this method consumes manpower, and it is difficult to adjust the speed of multiple pumps on time for a long time.

Based on the above problems, the present invention provides a brand-new water pump, which can automatically and regularly adjust the rotating speeds of a plurality of water pumps and control the work of the water pumps. Moreover, the water pump has a plurality of control modes, which is low in cost and simple to operate, and further improves the user experience.

SUMMARY

The present invention provides an electronic device for controlling a water pump, wherein the electronic device includes a speed regulating module, a control module, a storage module and a communication module; and wherein, the speed regulating module includes a relay group, a starting capacitor group and a coil group; and
wherein, the relay group includes a first relay, a second relay and a third relay respectively, wherein all the three relays include a first end and a second end; and
wherein, the starting capacitor group includes a first starting capacitor, a second starting capacitor and a third starting capacitor respectively; and
wherein, the coil group includes a first main coil, a second main coil, a first secondary coil and a second secondary coil, wherein all the four coils have a first end and a second end; and
wherein, two ends of the electronic device are respectively connected with a neutral line and a live line, the first ends of the four coils and the three relays are the ends close to the live line, the second ends of the four coils and the three relays are the ends close to the neutral line, and the second ends of the four coils are electrically connected with the neutral line; and
wherein, the first end of the first relay is connected with the live wire, the second end is electrically connected with the first end of the first main coil, the first end of the second relay is electrically connected with the second end of the first secondary coil through the second starting capacitor, the second end of the second relay is electrically connected with the first end of the first secondary coil, the first end of the third relay is electrically connected with the live line, and the second end of the third relay is electrically connected with the first end of the second main coil, and is electrically connected with the first end of the second secondary coil through the third starting capacitor, the first end of the first main coil and the first end of the first secondary coil are electrically connected through the first starting capacitor.

The present invention further provides a water pump capable of automatically adjusting rotating speeds at regular intervals, comprising an electronic device, wherein the electronic device includes a speed regulating module, a control module, a storage module, a communication module and a clock module; and wherein the speed regulating module includes a relay group, a starting capacitor group and a coil group; and
wherein, the relay group includes a first relay, a second relay and a third relay respectively, wherein all the three relays include a first end and a second end; and
the starting capacitor group includes a first starting capacitor, a second starting capacitor and a third starting capacitor respectively; and the coil group includes a first main coil, a second main coil, a first secondary coil and a second secondary coil, wherein all the four coils have a first end and a second end; and
wherein, two ends of the electronic device are respectively connected with a neutral line and a live line, the first ends of the four coils and the three relays are the ends close to the live line, the second ends of the four coils and the three relays are the ends close to the neutral line, and the second ends of the four coils are electrically connected with the neutral line; and
wherein, the first end of the first relay is connected with the live wire, the second end is electrically connected with the first end of the first main coil, the first end of the second relay is electrically connected with the second end of the first secondary coil through the second starting capacitor, the second end of the second relay is electrically connected with the first end of the first secondary coil, the first end of the third relay is electrically connected with the live line, and the second end of the third relay is electrically connected with the first end of the second main coil, and is electrically connected with the first end of the second secondary coil through the third starting capacitor, the first end of the first main coil and the first end of the first secondary coil are electrically connected through the first starting capacitor; and
wherein the control module is electrically connected with the clock module; and
wherein, the water pump includes three rotating speed gears and electrified circuits with three different powers, and the three relays respectively control the on and off of the electrified circuits with three different powers in one-to-one correspondence, so that the water pump can be switched among the three rotating speed gears, and the clock module can control the three relays to work regularly.

The present invention further provides a use method for a water pump capable of automatically adjusting rotating speeds at regular intervals, comprising the following steps:
providing the water pump, which includes a first relay, a second relay and a third relay, wherein the three relays cooperate with each other to control the on and off of electrified circuits with three different power; the electrified circuits include a first electrified circuit, a second electrified circuit and a third electrified circuit, wherein the first relay controls the first electrified circuit, the second relay cooperates with the first relay to control the second electrified circuit, and the third relay controls the third electrified circuit; and when the first electrified circuit and the second electrified circuit are switched on and the third electrified circuit is switched off, the water pump is in a high gear; and when the first electrified circuit is switched on and the second electrified circuit and the third electrified circuit are switched off, the water pump is in a standard speed range; and when the first electrified circuit and the second electrified circuit are switched off and the third electrified circuit is switched on, the water pump is in a low gear.

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

In the drawings

Figure 1:
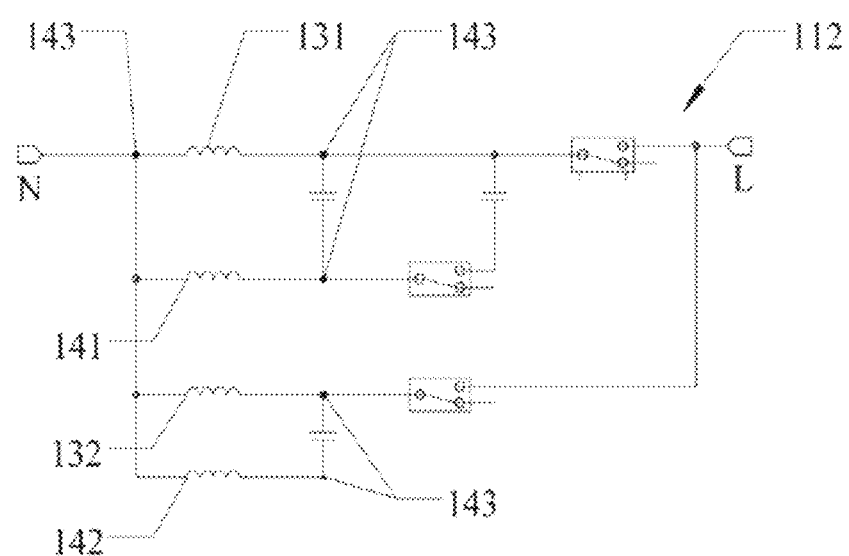
FIG. 1 is a schematic circuit diagram of a speed regulating module in the application of the present invention.

First circuit board (100); Speed regulating module (110); First relay (111); Second relay (112); Third relay (113); First starting capacitor (121); Second starting capacitor (122); Third starting capacitor (123); First main coil (131); Second main coil (132); First secondary coil (141); Second secondary coil (142); Motor multi-tap connection terminal (143); Power socket (120); Connection socket (130); Control module (140); Storage module (150); Communication module (160); Transceiver (161); Switching diode (162); Clock module (170); Current sensor (180); Second circuit board (200); Rectifier bridge (210); Off-line switch (220); Three-terminal adjustable shunt regulator (230); User interface (300); Cover plate (310); First electrified circuit (410); Second electrified circuit (420); Third electrified circuit (430); Fire line (L); Neutral line (N).

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

As a preferred embodiment of the application of the present invention, the application of the present invention provides an electronic device for controlling a water pump, and the electronic device realizes the conversion of the working state of equipment by controlling various functional modules.

In this embodiment, the electronic device includes a speed regulating module 110, a control module 140, a storage module 150 and a communication module 160.

Figure 2:
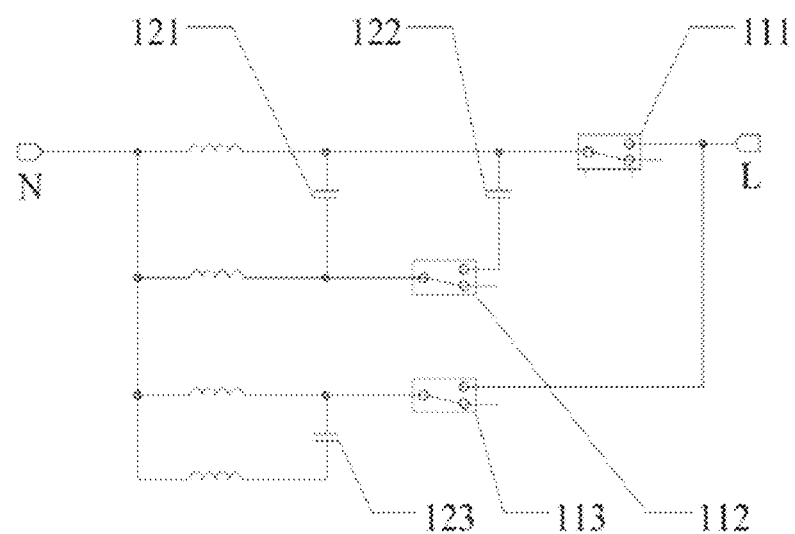
FIG. 2 is a schematic circuit diagram of the speed regulating module in the application of the present invention.

Referring to FIGS. 1 and 2, the speed regulating module 110 includes a relay group, a starting capacitor group and a coil group, wherein the relay group includes a first relay 111, a second relay 112 and a third relay 113, and the starting capacitor group includes a first starting capacitor 121, a second starting capacitor 122 and a third starting capacitor 123, respectively; and the coil group includes a first main coil 131, a second main coil 132, a first secondary coil 141 and a second secondary coil 142.

In some embodiments, the number of electronic components contained in the relay group, the starting capacitor group and the coil group can be one, two or other quantitative characteristics.

Further, two ends of the electronic device are respectively connected with a neutral line N and a live line L; three relays all include a first end and a second end, and four coils also have a first end and a second end, wherein the first ends of the four coils and the three relays are the ends close to the live line L, and the second ends of the four coils and the three relays are the ends close to the neutral line N.

Specifically, referring to FIGS. 1 and 2, the connection relationship among the relay group, the starting capacitor group and the coil group is as follows. The first end of the first relay 111 is connected with the live wire L, the second end of the first relay 111 is electrically connected with the first end of the first main coil 131, the first end of the second relay 112 is electrically connected with the second end of the first relay 111 through the second starting capacitor 122, the second end of the second relay 112 is electrically connected with the first end of the first secondary coil 141, the first end of the third relay 113 is electrically connected with the live wire L, the second end of the third relay 113 is electrically connected to the first end of the second main coil 132, and at the same time, the second end of the third relay 113 is electrically connected to the first end of the second secondary coil 142 through the third starting capacitor 123. The first end of the first main coil 131 and the first end of the first secondary coil 141 are electrically connected through the first starting capacitor 121, and the second ends of the four coils in the coil group are electrically connected with the neutral line N. The speed regulating module 110 enables the whole electronic device to switch the working mode of the water pump through the speed regulating module 110 through a simple and convenient circuit connection relationship.

Figure 3:
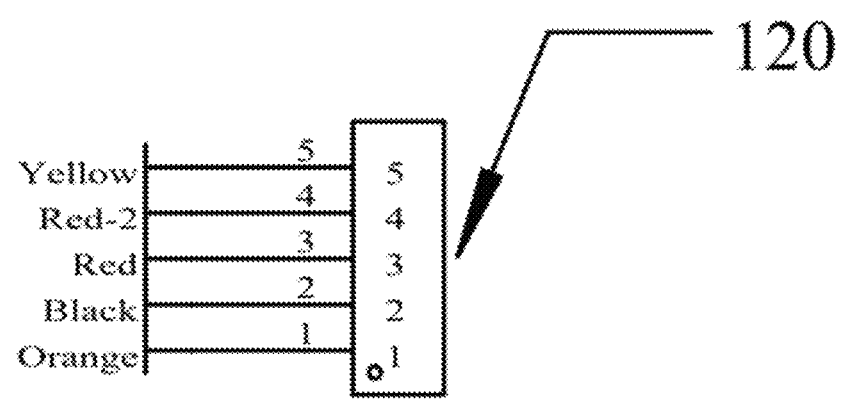
FIG. 3 is a schematic circuit diagram of the power socket in the application of the present invention.
Figure 4:
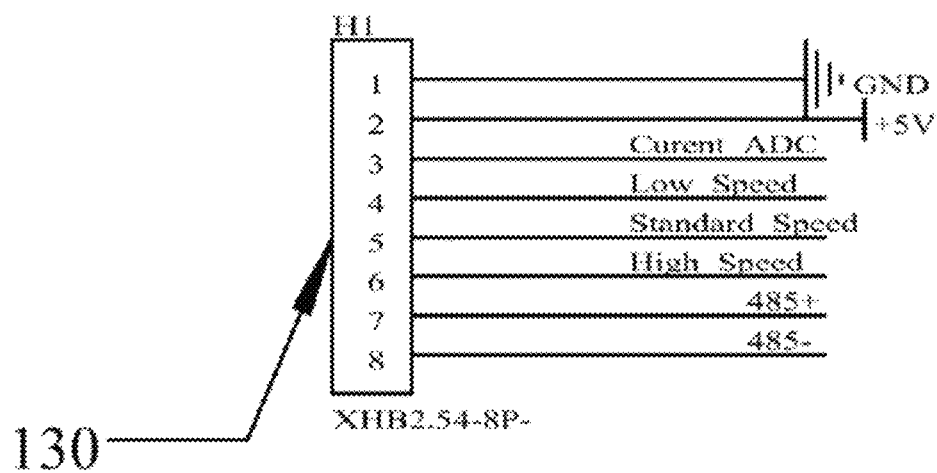
FIG. 4 is a schematic circuit diagram of a connection socket in the application of the present invention.
Figure 5:
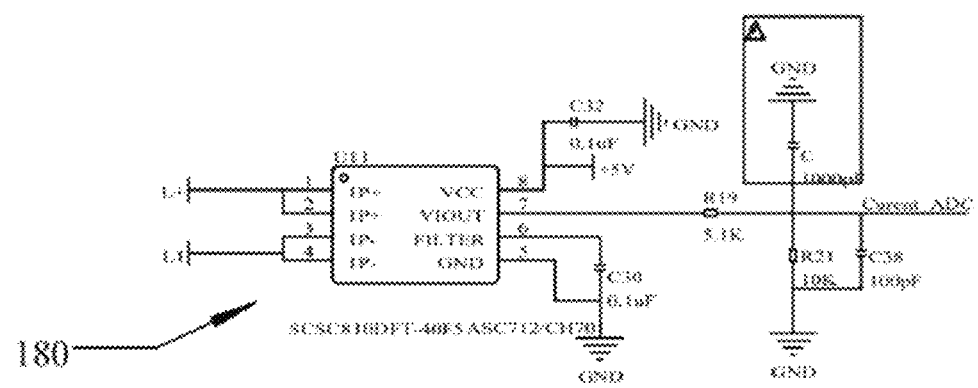
FIG. 5 is a schematic circuit diagram of the current sensor in the application of the present invention.

Further, the electronic device is provided with a plurality of motor multi-tap connection terminals 143 and includes a power socket 120. Referring to FIGS. 1 and 2, the motor multi-tap connection terminal 143 is located on the speed regulating module 110. Referring to FIG. 3, the power socket 120 has interfaces corresponding to the motor multi-tap connection terminals 143. Yellow, Red-2, Red, Black and Orange in the figure are all interfaces corresponding to the motor multi-tap connection terminals 143. The motor multi-tap connection terminals 143 are connected to the corresponding interfaces, and at the same time, the motor of the water pump can be connected to a plurality of motor multi-tap connection terminals 143 through wires. After electrifying, power is supplied by the power socket 120, and the power transmitted by the electronic device drives the water pump to rotate and controls the rotating speed of the motor of the water pump.

The first ends of the three relays all have gear terminals. When the relays are closed to the gear terminals, the motor of the water pump can have different rotational speeds. Wherein, the first end of the first relay 111 has a standard-speed gear terminal, the first end of the second relay 112 has a high-speed gear terminal, and the first end of the third relay 113 has a low-speed gear terminal. The three relays enable the water pump to have three gear speeds of high-speed gear, standard speed gear and low speed gear through different on and off states, and the three gear speeds are controlled and adjusted by the control module 140 in the electronic device.

Further, the three relays communicate with the control module 140 through a connection socket 130, wherein the connection socket 130 is provided with connecting interfaces corresponding to the gear terminals. In the figure, "Low speed", "Standard speed" and "High speed" are connection interfaces corresponding to gear terminals, wherein the first relay 111 is connected to the Standard speed interface, the second relay 112 is connected to the High-speed interface, and the third relay 113 is connected to the Low-speed interface. The connection socket 130 is electrically connected with the control module 140 to realize the control of the three relays by the control module 140.

In this embodiment, referring to FIGS. 3 to 6, the connection socket 130 is connected to the current sensor 180 and the control module 140 through the "Current ADC" interface. The current sensor 180 is an ASC712/CH701 chip, which can sense the information of the measured current, and can transform the sensed information into electrical signals meeting certain standards or other required forms of information according to certain rules for output.

Figure 6:
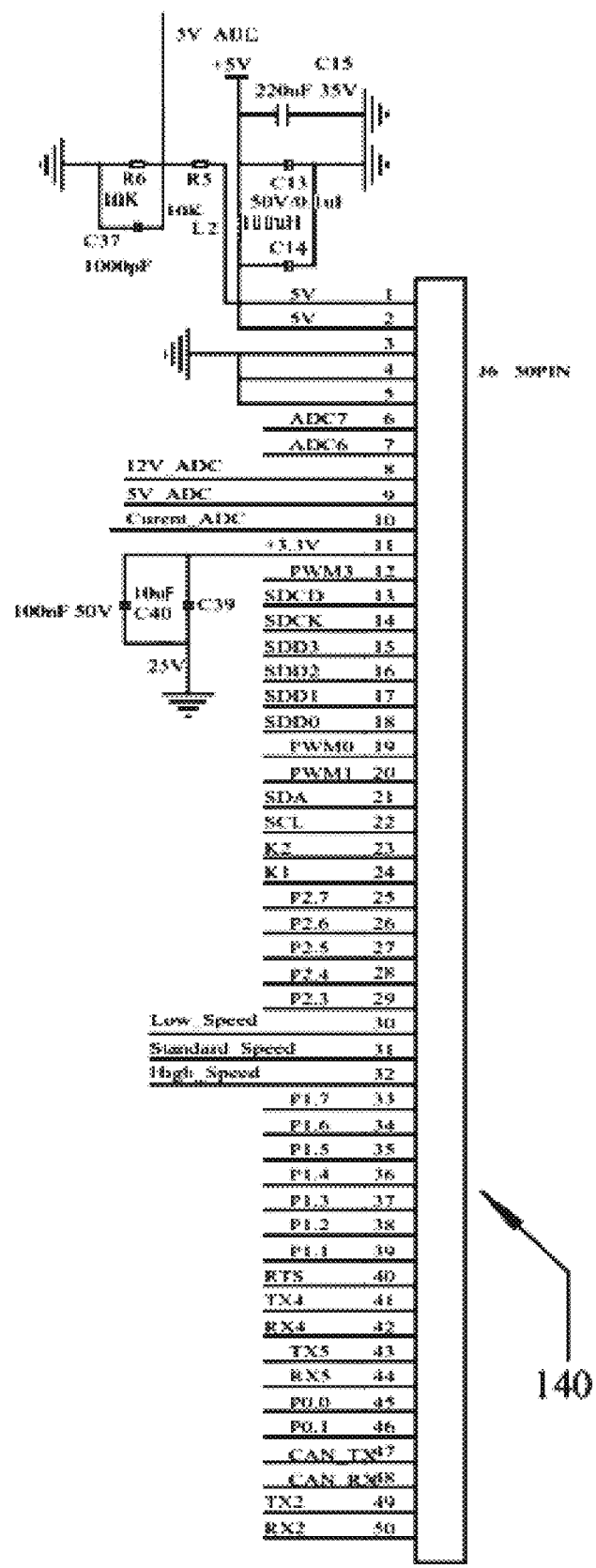
FIG. 6 is a schematic circuit diagram of the control module in the application of the present invention.
Figure 7:
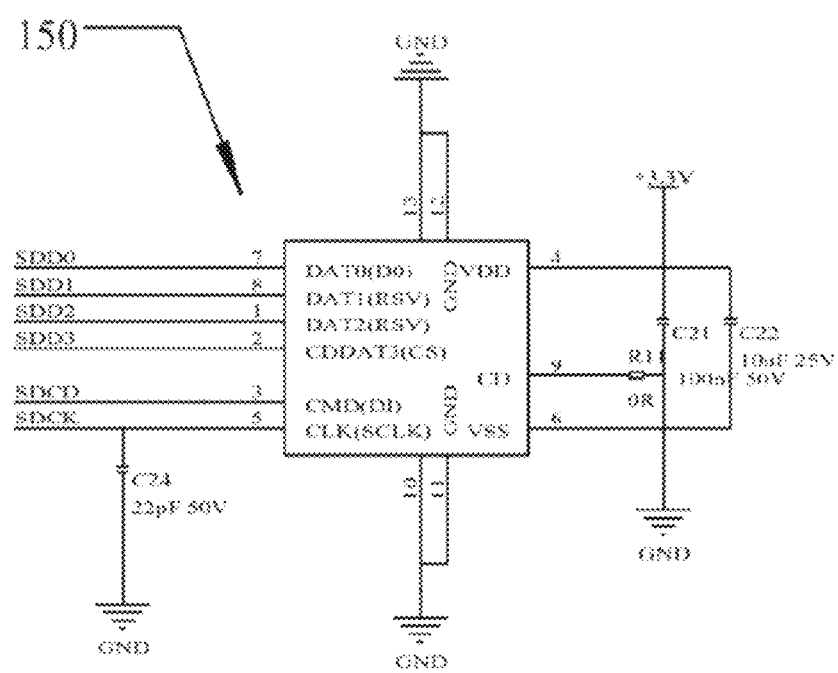
FIG. 7 is a schematic circuit diagram of a storage module in the application of the present invention.

Referring to FIGS. 6 and 7, the control module 140 is electrically connected to the storage module 150. In this embodiment, the storage module 150 is a detachable SD card, and the rotational speed mode and time parameters set by the user can be stored through the storage module 150, thus realizing the automatic adjustment function.

In this embodiment, the specific type of the control module 140 is not limited. In other embodiments, the control module 140 may include one or more processing devices, such as a microprocessor, a CPU, etc., such as a general-purpose or special-purpose microprocessor, operable to execute programming instructions or micro-control codes related to the operation of the relay. Meanwhile, the control module 140 not only refers to an integrated circuit included in a computer in the field, but also refers to a controller, a microcontroller, a microcomputer, a programmable logic controller (PLC), an application specific integrated circuit (ASIC) and other programmable circuits.

In other embodiments (not shown in the figure), the storage module can be mainly a USB flash drive, a mobile hard disk, or other storage devices with storage function such as SSD solid state hard disk. In an additional or alternative embodiment (not shown in the figure), the storage module may represent a random-access memory such as DRAM, or a read-only memory such as ROM or FLASH. In addition, the storage module may generally include memory elements, including but not limited to computer-readable media (e.g., random access memory (RAM)), computer-readable non-volatile media (e.g., flash memory) and/or other suitable memory elements.

The electronic device also has a communication module 160 and remote-control equipment. Through the remote-control equipment, the communication module 160 can communicate wirelessly with the user and generate a set of control signals according to the control instructions issued by the user. The control signals will be transmitted to three relays, thus changing the working state of the water pump. In this embodiment, the type of the remote-control equipment is not limited.

In other embodiments (not shown in the figure), mobile devices include, but are not limited to, mobile phones, such as Apple's iPhone®, other portable electronic devices, such as Apple's iPod Touches®, Apple's iPad®, and the mobile device operating system based on Google's Android, as well as any other portable electronic devices, including software, firmware, hardware or a combination thereof, which can at least receive signals, decode (if necessary), and exchange information with the server to verify information. Typical components of a mobile device may include, but are not limited to, permanent memory such as flash ROM, random access memory such as SRAM, camera, battery, LCD driver, display, cellular antenna, speaker, Bluetooth circuit and WIFI circuit, wherein the permanent memory may contain programs, applications and/or operating systems for mobile devices. The mobile device may be a key fob. Key fob which can be a security token, is a small hardware device with built-in authentication mechanism. It is used to manage and protect access to network services and data, provide access, and communicate with devices.

In other embodiments (not shown in the figure), the communication means can use any of a variety of communication standards, protocols and technologies, Include, but are not limited to, global system for mobile communications (GSM), enhanced data GSM environment (EDGE), high-speed downlink packet access (HSDPA), wideband code division multiple access (W-CDMA), code division multiple access (CDMA), time division multiple access (TDMA), BLUETOOTH®, wireless fidelity (Wi-Fi) (for example, IEEE802.11a, IEEE802.11b, IEEE802.11g or IEEE802.11n), Voice over Internet Protocol (VOIP), Wi-MAX, email protocol (e.g., Internet Message Access Protocol (IMAP) and/or post office protocol (POP)), instant messaging (e.g., Extensible Messaging and Presence Protocol (XMPP), session initiation protocol for instant messaging and presence leveraging extensions (SIMPLE) or Instant Messaging Presence Services (IMPS), or Short Message Service (SMS), or any other suitable communication protocol, including those developed and not yet completed since the date of submission of this document.

Figure 8:
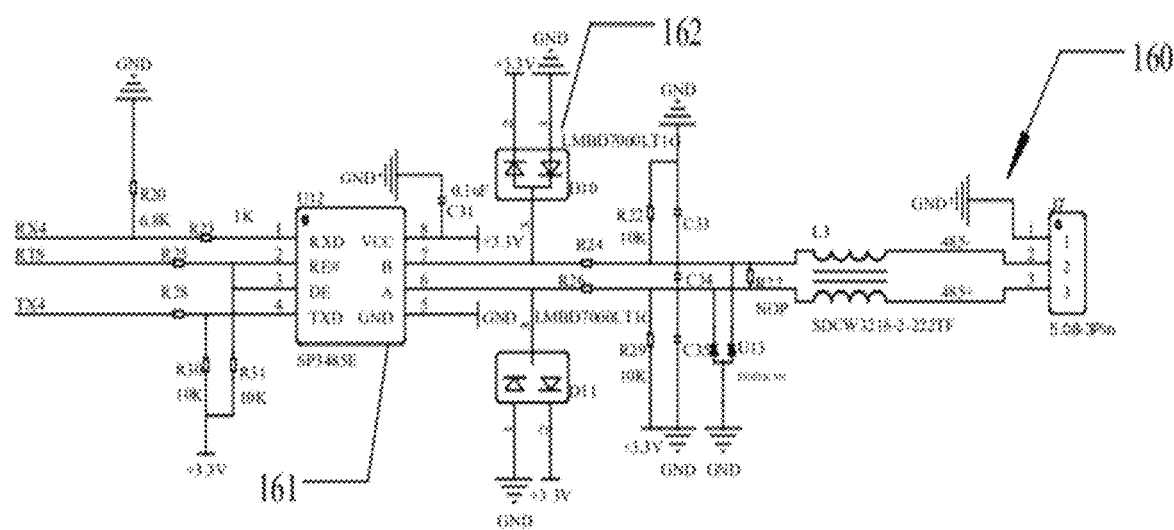
FIG. 8 is a schematic circuit diagram of the communication module in the application of the present invention.

Referring to FIG. 8, the communication module 160 is provided with a transceiver 161 and a switching diode 162. In this embodiment, the transceiver 161 is an SP3485E chip and the switching diode 162 is an LMBD7000LT1G switching diode 162.

In other embodiments, the model of the transceiver 161 can also be SP3485EN, or other types of transceivers such as MAX3485E, and the model of the switching diode 162 can be MMBD7000LT1G, or other types of switching diodes such as 1N4148.

As a preferred embodiment of the application of the present invention, the application of the present invention further provides a water pump capable of automatically adjusting rotating speeds at regular intervals, which uses the electronic device described above, and realizes the function of automatically adjusting the rotating speeds at regular intervals of the water pump through the electronic device.

Figure 9:
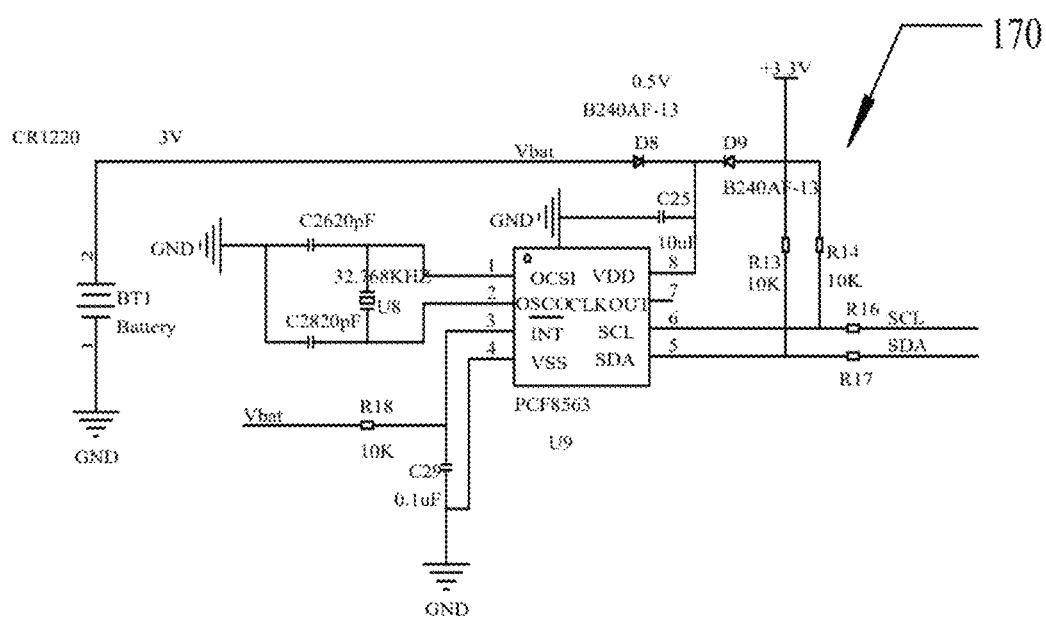
FIG. 9 is a schematic circuit diagram of the clock module in the application of the present invention.

Further, as shown in FIG. 9, the electronic device further includes a clock module 170, and the control module 140 is electrically connected to the clock module 170. Specifically, the water pump includes three rotating speed gears and electrified circuits with three different powers. By cooperating with each other, the three relays can control the on and off of the electrified circuits with three different powers, so as to switch the water pump among the three rotating speed gears. The clock module 170 can control the working time of the three relays regularly and make the three relays in different closed and off states in a specific time.

Figure 10:
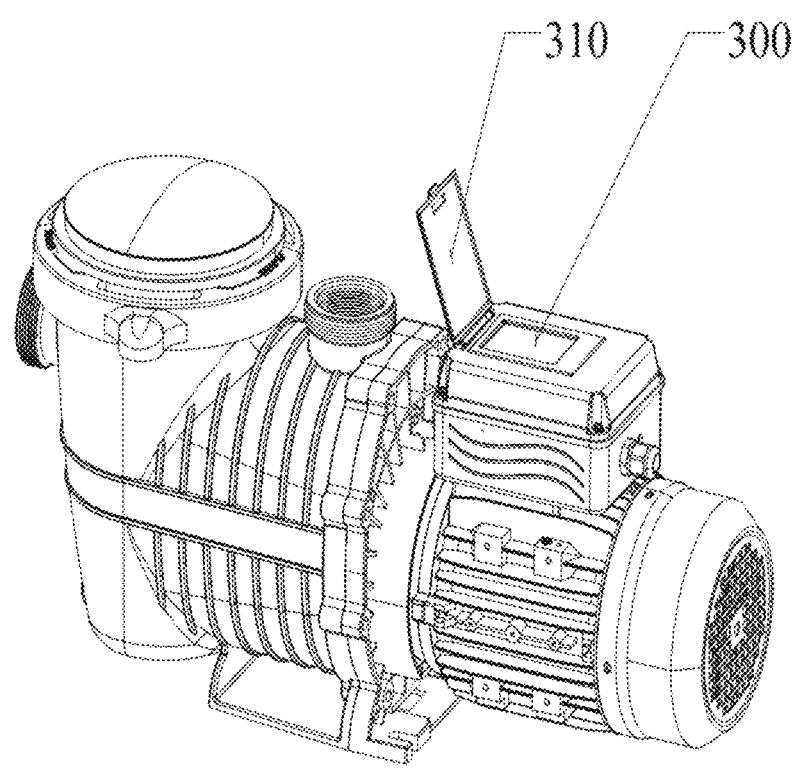
FIG. 10 is a schematic diagram of a water pump in the application of the present invention.
Figure 11:
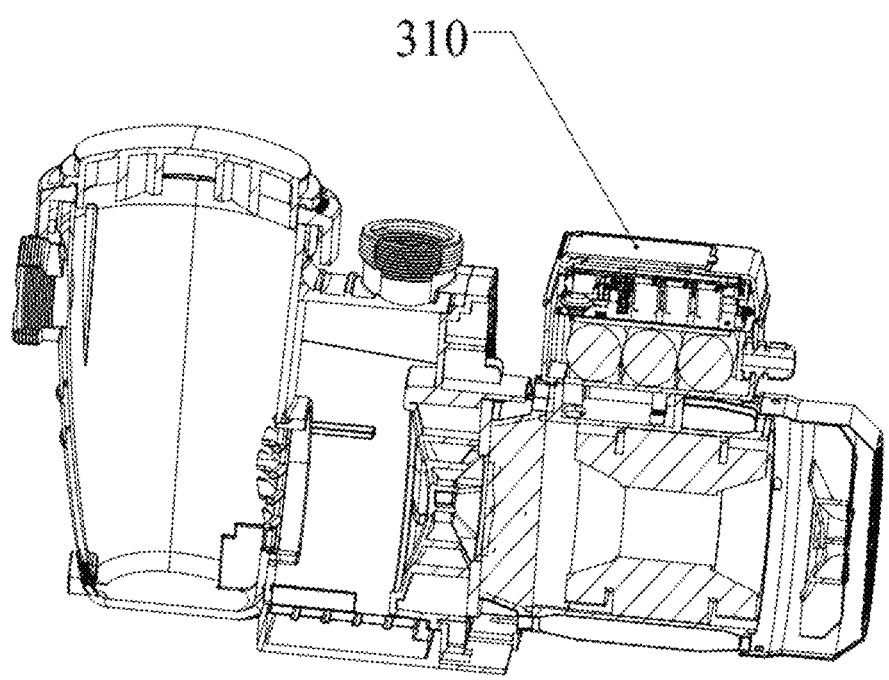
FIG. 11 is a sectional view of the water pump in the application of the present invention.
Figure 12:
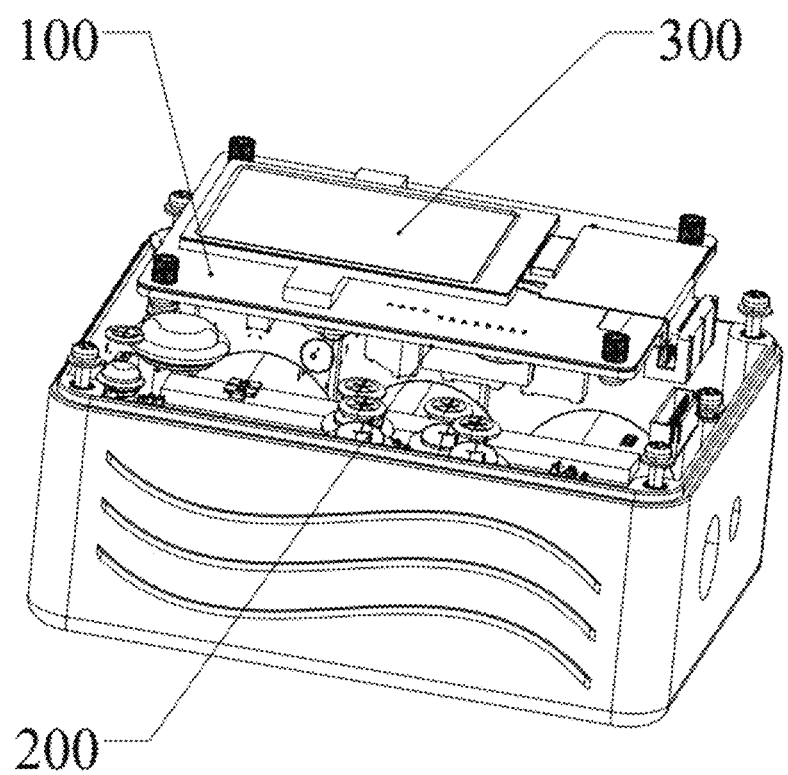
FIG. 12 is a schematic diagram of a circuit board in the application of the present invention.

In this embodiment, referring to FIG. 10 to FIG. 12, the water pump includes two circuit boards, namely a first circuit board 100 and a second circuit board 200. The electronic device is arranged on the first circuit board 100, and the second circuit board 200 is provided with various electronic component modules, thus providing power supply and protection for all electronic components. The first circuit board 100 and the second circuit board 200 cooperate with each other to realize the function of the water pump.

Figure 13:
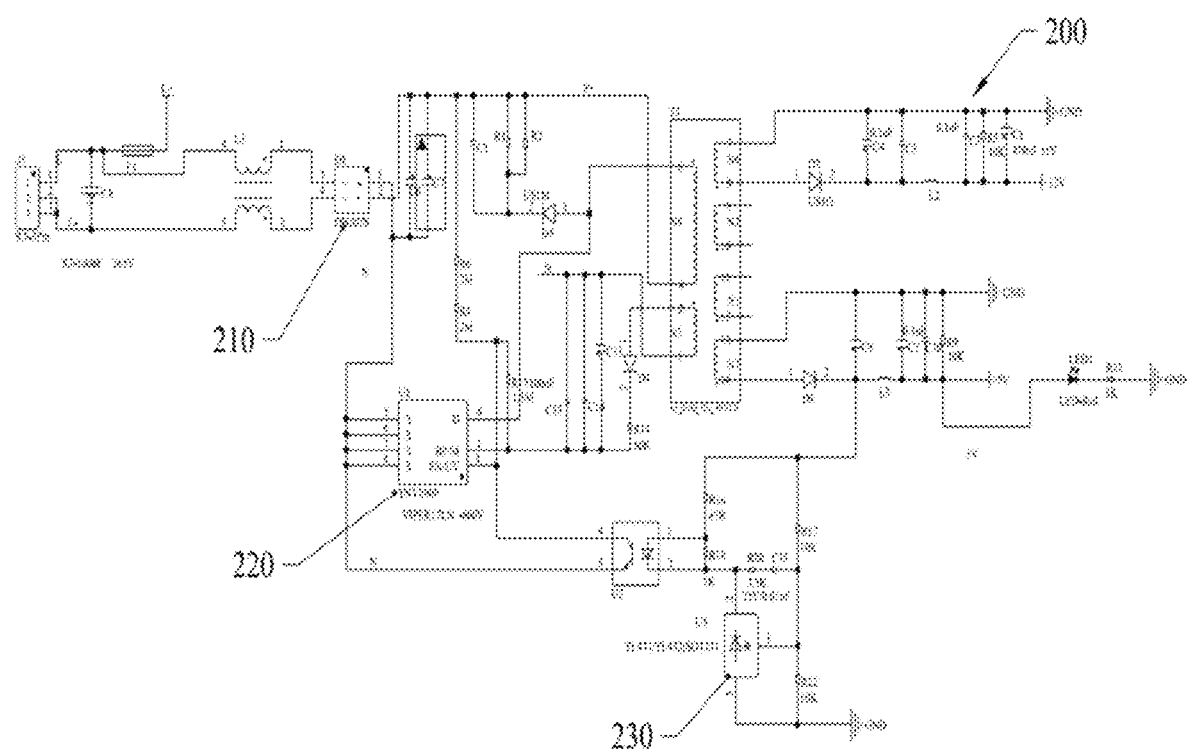
FIG. 13 is a schematic circuit diagram of the second circuit board in the application of the present invention.
Figure 14:
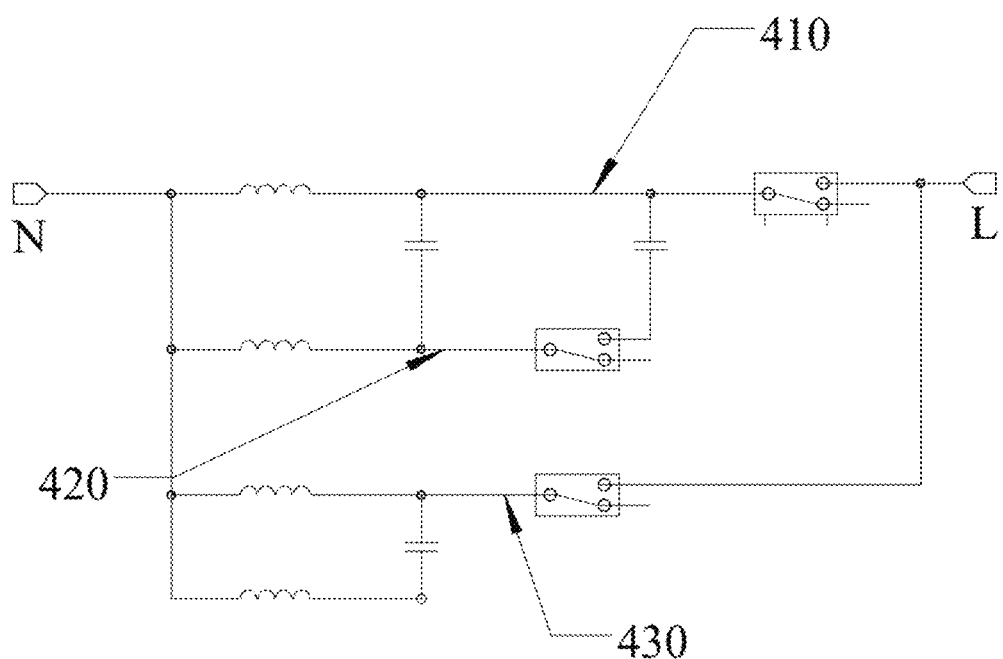
FIG. 14 is a schematic circuit diagram of the speed regulating module in the application of the present invention.

Referring to FIG. 13, the second circuit board 200 includes a rectifier bridge 210, which is a DB207S rectifier bridge. The rectifier bridge 210 converts the power supply current accessed by the second circuit board 200 and supplies power to other components.

Further, the second circuit board 200 includes an off-line switch 220 and a three-terminal adjustable shunt regulator 230. The off-line switch can also ensure that each module can work independently without interference. The purpose of this is to prevent one module from being damaged due to high voltage discharge or other reasons, and at the same time, the three-terminal adjustable shunt regulator 230 uses feedback control to adjust the current of the control tube by detecting and comparing the output voltage, so as to keep the output voltage at a stable value all the time.

In this embodiment, the off-line switch 220 is a TNY290P off-line switch, and the three-terminal adjustable shunt regulator 230 is a TL431 three-terminal adjustable shunt regulator. In other embodiments (not shown in the figure), the off-line switch 220 and the three-terminal adjustable shunt regulator 230 can also be of other types.

The second circuit board 200 is connected with a power supply to supply power to the first circuit board 100, and the power supply current is converted by the rectifier bridge 210 and then transmitted to the off-line switch 220 and the three-terminal adjustable shunt regulator 230.

In this embodiment, the water pump includes a user interface 300 and remote-control equipment. The user interface 300 is connected to the first circuit board 100, and the working parameters of the water pump can be set through the user interface 300. The user interface 300 communicates with the remote-control equipment. Specifically, through the user interface, the clock module 170 and the rotational speed of the water pump can be set and adjusted directly on the water pump. Users can also remotely control the water pump through remote-control equipment.

In this embodiment, the user interface 300 is a touch screen, through which the water pump can be directly controlled. The touch screen is covered with a cover plate 310, which can be turned over with a turning angle of 0 to 120 degrees, and the cover plate 310 protects the touch screen.

In other embodiments (not shown in the figure), the control mode may include physical buttons, such as rocker, dial, slide switch, touch switch, toggle switch and joystick, click wheel, etc. In some alternative embodiments (not shown in the figure), the control mode can be coupled to any of the following (or not coupled): keyboard, infrared port, USB port and pointing device, such as mouse. In some embodiments (not shown in the figure), the control mode can also be electronic devices, such as touch screens, computer devices and other control system devices.

As a preferred embodiment of the application of the present invention, the application of the present invention further provides a use method for a water pump capable of automatically adjusting rotating speeds at regular intervals.

First, a water pump that can automatically adjust the rotating speed at regular intervals is provided. The water pump includes a first relay 111, a second relay 112 and a third relay 113. By cooperating with each other, the three relays can control the on and off of the electrified circuits with three different powers.

Referring to FIG. 1 to FIG. 14, these three electrified circuits are respectively a first electrified circuit 410, a second electrified circuit 420 and a third electrified circuit 430. The first relay 111 controls the first electrified circuit 410, the second relay 112 cooperates with the first relay 111 to control the second electrified circuit 420, and the third relay 113 controls the third electrified circuit 430.

Specifically, when the first relay 111 and the second relay 112 are switched on, and the third relay 113 is switched off, at this time, the first electrified circuit and the second electrified circuit are switched on, and the third electrified circuit is switched off, so that the water pump is in a high gear.

when the first relay 111 is switched on and the second relay 112 and the third relay 113 are switched off, at this time, the first electrified circuit is switched on, the second electrified circuit and the third electrified circuit are switched off, and the water pump is in the standard speed range.

when the first relay 111 and the second relay 112 are switched off and the third relay 113 is switched on, the first electrified circuit and the second electrified circuit are switched off, and the third electrified circuit is switched on, the water pump is at a low speed.

Further, the water pump is controlled by the user, and has a user interface 300, through which the user can set the water pump at regular intervals, so that the water pump can automatically adjust the working speed at regular intervals.

This method can realize the automatic adjustment of pump speed through simple circuit control, which is convenient and practical. At the same time, due to the adoption of timing control, different working time periods can be preset according to actual needs, so that the water pump runs at different speed gears in different time periods, thus better meeting the needs of users. In addition, this method can also effectively save energy and improve the efficiency of water pump.

Compared with the traditional water pump, the water pump provided by the present invention has a plurality of control modes, and the rotating speeds of a plurality of water pumps can be automatically and regularly adjusted, so as to control the beneficial effects of the work of the water pump; meanwhile, the water pump is low in cost and simple to operate, and the use experience of users can be further improved.

In the broad sense of the application of the present invention, the water pump capable of automatically adjusting rotating speeds at regular time can be applied to the following industries: water supply system: the water pump can realize automatic rotating speed adjustment, improve water resource utilization efficiency and reduce energy consumption, for example, constant pressure closed-circuit control of the water supply pressure of a pumping station; power equipment: this kind of water pump can realize automatic adjustment of rotating speed in power equipment and improve the operating efficiency of power equipment; industrial production environment: in the industrial production environment under the conditions of vibration, high temperature, electromagnetism, radiation, humidity, dust or certain acid and alkali corrosion, this pump can provide corresponding water pressure and flow rate; in the field of biopharmaceuticals, this pump can provide accurate water pressure and flow control in the field of biopharmaceuticals that require cleanliness and data recording; energy-saving transformation: in the water supply industry, the energy-saving effect of a frequency control feed pump is very remarkable.

To sum up, the application of the present invention enables the water pump to automatically and regularly adjust the rotating speeds of a plurality of water pumps and control the work of the water pumps through unique settings, and the water pump has a plurality of control modes, so that the cost is low and the operation is simple. At the same time, it also provides a flexible and efficient control mode, which can not only meet the requirements under different working conditions, save energy, but also reduce the mechanical wear and noise of the pump, prolong the service life of the pump, and also improve the efficiency of hydraulic regulation. The frequency control feed pump technology is widely used to achieve more efficient and energy-saving hydraulic regulation.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

What is claimed is:

1. An electronic device for controlling a water pump, wherein said electronic device comprises a speed regulating module, a control module, a storage module and a communication module; and
   wherein, said speed regulating module comprises a relay group, a starting capacitor group and a coil group; and
   wherein, said relay group comprises three relays, three relays are a first relay, a second relay and a third relay respectively, wherein three said relays all comprise a first end and a second end; and
   wherein, said starting capacitor group comprises three capacitors, three capacitors are a first starting capacitor, a second starting capacitor and a third starting capacitor respectively; and
   wherein, said coil group comprises four coils, four coils are a first main coil, a second main coil, a first secondary coil and a second secondary coil, wherein four said coils all have a first end and a second end; and
   wherein, two ends of said electronic device are respectively connected with a neutral line and a live line, the first ends of four said coil and three said relays are the ends close to the live line, the second ends of four said coil and three said relays are the ends close to the neutral line, and the second ends of four said coil are electrically connected with the neutral line; and
   wherein, the first end of said first relay is connected with a live wire, the second end is electrically connected with the first end of said first main coil, the first end of said second relay is electrically connected with the second end of said first secondary coil through said second starting capacitor, the second end of said second relay is electrically connected with the first end of said first secondary coil, the first end of said third relay is electrically connected with the live line, and the second end of said third relay is electrically connected with the first end of said second main coil, and is electrically connected with the first end of said second secondary coil through the third starting capacitor, the first end of said first main coil and the first end of said first secondary coil are electrically connected through the first starting capacitor.

2. The electronic device for controlling a water pump according to claim 1, wherein said electronic device is provided with a plurality of motor multi-tap connection terminals and comprises a power socket and said power socket is provided with interfaces corresponding to said motor multi-tap connection terminals.

3. The electronic device for controlling a water pump according to claim 2, wherein said electronic device is connected with a motor, and said motor is connected with the plurality of motor multi-tap connection terminals through wires.

4. The electronic device for controlling a water pump according to claim 3, wherein the first end of three said relays has a gear terminal, wherein the first end of said first relay has a standard-speed gear terminal, the first end of said second relay has a high-speed gear terminal, and the first end of said third relay has a low-speed gear terminal.

5. The electronic device for controlling a water pump according to claim 4, wherein three said relays are communicated with said control module through a connection socket, wherein said connection socket is provided with connecting interfaces corresponding to said gear terminal and said connection socket is electrically connected with said control module, so that said control module realizes control for three said relays.

6. The electronic device for controlling a water pump according to claim 5, wherein said connection socket is also connected with a current sensor, and said current sensor is capable of sensing an information of a measured current and transforming the sensed information into an electrical signal meeting certain standards or other required information according to a certain rule for output.

7. The electronic device for controlling a water pump according to claim 1, wherein said control module is able to control three kinds of speed gears, namely, a high-speed gear, a standard speed gear and a low-speed gear, and said speed gears are controlled by different on and off states of three said relays.

8. The electronic device for controlling a water pump according to claim 6, wherein said control module is electrically connected with said storage module and said storage module is an SD card; and a rotational speed mode and a time parameter set by a user can be stored through said storage module.

9. The electronic device for controlling a water pump according to claim 8, wherein said electronic device is equipped with a remote control equipment; and wherein through said remote control equipment, said communication module is able to wirelessly communicate with the user and generate a group of control signals according to a control instruction issued by the user, and said control signals are to be transmitted to three said relay.

10. The electronic device for controlling a water pump according to claim 9, wherein said communication module is provided with a transceiver and a switching diode.

11. A water pump capable of automatically adjusting rotating speeds at regular intervals, comprising an electronic device, wherein said electronic device comprises a speed regulating module, a control module, a storage module, a communication module, and a clock module; and
   wherein said speed regulating module comprises a relay group, a starting capacitor group and a coil group; and
   wherein, said relay group comprises three relays, three relays are a first relay, a second relay and a third relay respectively, wherein all three said relays comprise a first end and a second end; and said starting capacitor group comprises a first starting capacitor, a second starting capacitor and a third starting capacitor respectively; and said coil group comprises four coils, said four coils comprises a first main coil, a second main coil, a first secondary coil and a second secondary coil, wherein four said coil all have a first end and a second end; and wherein, two ends of said electronic device are respectively connected with a neutral line and a live line, the first ends of four said coil and three said relays are the ends close to the live line, the second ends of four said coil and three said relays are the ends close to the neutral line, and the second ends of four said coil are electrically connected with the neutral line; and wherein, the first end of said first relay is connected with a live wire, the second end is electrically connected with the first end of said first main coil, the first end of said second relay is electrically connected with the second end of said first secondary coil through said second starting capacitor, the second end of said second relay is electrically connected with the first end of said first secondary coil, the first end of said third relay is electrically connected with the live line, and the second end of said third relay is electrically connected with the first end of said second main coil, and is electrically connected with the first end of said second secondary coil through the third starting capacitor, the first end of said first main coil and the first end of said first secondary coil are electrically connected through the first starting capacitor; and wherein said control module is electrically connected with said clock module; and wherein, said water pump comprises three rotating speed gears and electrified circuits with three different powers, and said three relays are control a on and off of said electrified circuits with three different powers in one-to-one correspondence respectively, so that said water pump can be switched among said three rotating speed gears, and said clock module controls three said relays to work regularly.

12. The water pump according to claim 11, wherein said water pump comprises a first circuit board and a second circuit board; and said electronic device is arranged on said first circuit board and said first circuit board and said second circuit board cooperate with each other to realize function of said water pump.

13. The water pump according to claim 12, wherein said second circuit board comprises a rectifier bridge to converts a power supply current accessed by the second circuit board to supply power to other components.

14. The water pump according to claim 13, wherein said second circuit board comprises an off-line switch.

15. The water pump according to claim 14, wherein said second circuit board comprises a three-terminal adjustable shunt regulator.

16. The water pump according to claim 15, wherein said second circuit board is connected with a power supply to supply power to said first circuit board and said power supply current is converted by said rectifier bridge and then transmitted to said off-line switch and said three-terminal adjustable shunt regulator.

17. The water pump according to claim 12, wherein said water pump comprises a user interface and a remote control equipment, wherein said user interface is connected to said first circuit board, and working parameters of said water pump can be set through said user interface, and said user interface communicates with said remote control equipment.

18. The water pump according to claim 17, wherein said user interface is a touch screen, and said user interface is covered with a cover plate which can be turned over and has a turning angle of 0 to 120 degrees.

19. A use method for a water pump capable of automatically adjusting rotating speeds at regular intervals, comprising following steps:
providing the water pump, which comprises three relays, said three relays are a first relay, a second relay, a third relay, wherein said three relays cooperate with each other to control a on and off of electrified circuits with three different power; and said electrified circuits comprise a first electrified circuit, a second electrified circuit and a third electrified circuit, wherein said first relay is control said first electrified circuit, said second relay cooperates with said first relay to control said second electrified circuit, and said third relay is control said third electrified circuit; and
when said first electrified circuit and said second electrified circuit are switched on and said third electrified circuit is switched off, said water pump is in a high gear; and
when said first electrified circuit is switched on and said second electrified circuit and said third electrified circuit are switched off, said water pump is in a standard speed range; and
when said first electrified circuit and said second electrified circuit are switched off and said third electrified circuit is switched on, said water pump is in a low gear.

20. The use method according to claim 19, wherein said water pump is controlled by a user and has a user interface, and the user can set said water pump at regular intervals through said user interface, so that said water pump is able to automatically adjust working speed at regular intervals.

* * * * *